United States Patent
Radloff et al.

[19]

[11] Patent Number: 5,852,739
[45] Date of Patent: Dec. 22, 1998

[54] LOW PROFILE PLATE INTERLOCK MECHANISM FOR A COMPUTER CHASSIS

[75] Inventors: Timothy Radloff, Austin; Stephen Cook, Georgetown, both of Tex.

[73] Assignee: Dell Computer Corporation, Round Rock, Tex.

[21] Appl. No.: 947,139

[22] Filed: Oct. 8, 1997

[51] Int. Cl.$^6$ .................................................. G06F 15/76
[52] U.S. Cl. ................................. 395/800.01; 361/683
[58] Field of Search .............................. 395/800.01, 828, 395/280; 361/679, 683–686, 725, 726, 732, 752, 759; 312/223.1, 223.2, 333; 392/80, 183

[56] References Cited

U.S. PATENT DOCUMENTS

| | | | |
|---|---|---|---|
| 4,909,579 | 3/1990 | Liu | 312/223.2 |
| 4,938,513 | 7/1990 | Gunderson | 292/80 |
| 5,255,154 | 10/1993 | Hosoi et al. | 361/681 |
| 5,264,986 | 11/1993 | Ohgami et al. | 361/685 |
| 5,313,596 | 5/1994 | Swindler et al. | 395/281 |
| 5,406,453 | 4/1995 | Cusato et al. | 361/683 |
| 5,527,104 | 6/1996 | Moss | 312/26 L |
| 5,570,270 | 10/1996 | Naedel et al. | 361/687 |
| 5,575,546 | 11/1996 | Radloff | 312/183 |
| 5,577,779 | 11/1996 | Dangel | 292/80 |
| 5,601,349 | 2/1997 | Holt | 312/265.6 |
| 5,757,617 | 5/1989 | Sherry | 361/685 |
| 5,791,753 | 8/1998 | Paquin | 312/332.1 |

*Primary Examiner*—Alpesh M. Shah
*Attorney, Agent, or Firm*—Haynes and Boone, L.L.P.

[57] ABSTRACT

A computer system includes a plate for mounting in a chassis. The plate slides into the chassis and is retained therein by a snap-in connection. An interlock device is provided for interlocking the plate and chassis. The device includes a first portion having a first end engaged with the plate and a second portion connected to a second end. The second portion extends angularly relative to the first portion and is engaged with the plate. An interlock member extends from the first portion and through an opening formed in the plate for engagement with the chassis. A pinch and pull motion removes the plate from the chassis.

23 Claims, 3 Drawing Sheets

LOW PROFILE PLATE INTERLOCK MECHANISM FOR A COMPUTER CHASSIS

BACKGROUND OF THE INVENTION

The disclosures herein relate generally to a computer chassis and more particularly to a mechanism for interlocking a plate with another plate in a computer chassis for limiting relative motion between both plates.

Computers include many parts and subassemblies that must be assembled in an efficient manner. Design of computers and their subassemblies requires simplified interfaces and, where possible, the elimination of the need for tools when assembling or disassembling the computers and their components.

Designers of computers must consider ease of manufacture and easy access for maintenance and repair. Many parts traditionally assembled and held together by screws require the use of tools for their installation and removal. Due to the space limitations caused by close packaging of components and subassemblies in the computer, limited space is available for the maneuvering and manipulation of tools or of the human hand.

Due to the limitation of working space within the computer chassis and other computer parts, it has been found to be beneficial to have components which use integral snaps and which are easily engaged and released. Such arrangements are not only beneficial during manufacture, but also during maintenance and the repair of computers. These arrangements, however, require not only the ease of assembly and disassembly, but also require reliable retention of the parts and components when they are installed.

In accordance with one attempted solution to the above-mentioned problem, a portable computer includes a body having a storing portion for storing a hard disk drive pack. The storing portion has an insertion opening which is open to the outside of the body. A hard disk drive holder is detachably connected to the hard disk drive pack. The holder includes a main body detachably fitted in the insertion portion. A pair of retaining members are provided on the main body and movable between an engaging position in which retaining members engage portions of the body to hold the main body in the insertion opening, and a retreat position in which the members are disengaged to allow the main body to be detached from the insertion opening. A cover plate is detachably fitted in the insertion opening and includes lock pins which engage the retaining members to lock the members in the engagement position. An interlock is coupled between the pair of retaining members.

Therefore, what is needed is a device for efficiently and effectively retaining a disk drive bracket in a computer chassis in a cost-effective manner which permits the bracket to be easily installed and removed without the need for or the use of tools to accomplish such installation and removal.

SUMMARY

One embodiment, accordingly, provides a plate which can be used for retaining the disk drive in a computer chassis and which can be easily installed and removed by a quick connect, quick disconnect device. To this end, a computer system includes a plate for mounting in a chassis. An interlock device is provided for interlocking the plate and the chassis. The interlock device includes a first portion having a first end engaged with a first plate retainer and a second portion connected to a second end. The second portion extends angularly relative to the first portion and is engaged with a second plate retainer. An interlock member extends from the first portion and through an opening formed in the plate for engagement with the chassis.

A principal advantage of this embodiment is that the plate is easily insertable into the chassis and retained therein by a snap-in connection, and is easily removable by a one-handed pinch and pull motion.

DETAILED DESCRIPTION OF THE PREFERRED EMBODIMENT

Figure 1:
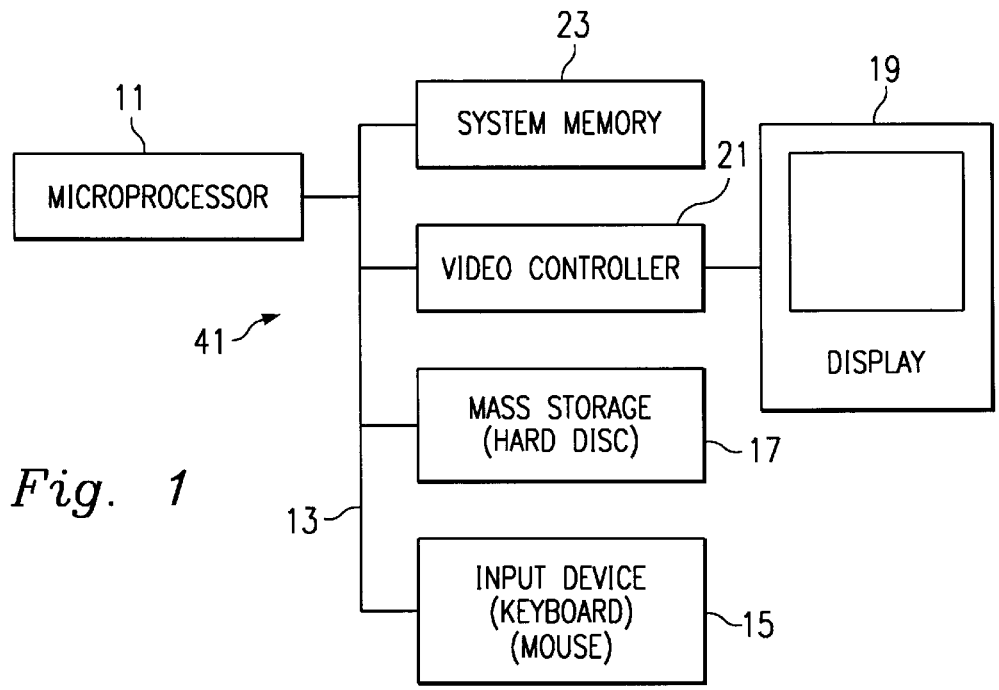
FIG. 1 is a diagrammatic view illustrating an embodiment of a typical computer system.

In one embodiment, a computer system 41, FIG. 1, includes a microprocessor 11 which is connected to a bus 13. Bus 13 serves as a connection between microprocessor 11 and other components of computer system 41. An input device 15 is coupled to microprocessor 11 to provide input to microprocessor 11. Examples of input devices include keyboards, touchscreens, and pointing devices such as mouses, trackballs and trackpads. Programs and data are stored on a mass storage device 17 which is coupled to microprocessor 11. Mass storage devices include such devices as hard disks, optical disks, magneto-optical drives, floppy drives and the like. Computer system 41 further includes a display 19 which is coupled to microprocessor 11 by a video controller 21. A system memory 23 is coupled to microprocessor 11 to provide the microprocessor with fast storage to facilitate execution of computer programs by microprocessor 11. It should be understood that other busses and intermediate circuits can be deployed between the components described above and microprocessor 11 to facilitate interconnection between the components and the microprocessor.

Figure 2:
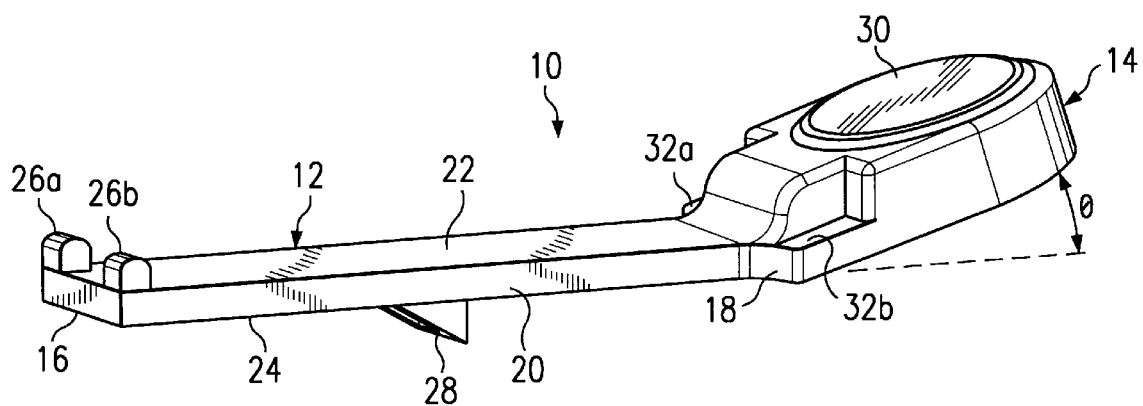
FIG. 2 is an isometric view illustrating an embodiment of an interlock device for mounting a drive plate in a computer chassis.

Referring to FIG. 2, an embodiment of an interlock device is illustrated and is generally designated 10 for use in computer system 41. Interlock device 10 is formed of a suitable flexible, synthetic material such as PC-ABS, and includes a first portion 12 and a second portion 14. First portion 12 is substantially flat and elongated and includes a first end 16, a second end 18, a mid-portion 20, an upper surface 22, and a lower surface 24. Upper surface 22 includes a pair of raised first guides 26a and 26b which are spaced apart. Lower surface 24 includes a wedge-shaped interlock member 28, extending from mid-portion 20.

Second portion 14 is connected to extend from second end 18 of first portion 12 and includes a gripping area 30 for gripping, and a pair of spaced apart grooved guides 32a, 32b. It should be noted that second portion 14 extends angularly relative to first portion 12, at an angle θ of approximately 17 degrees.

Figure 3:
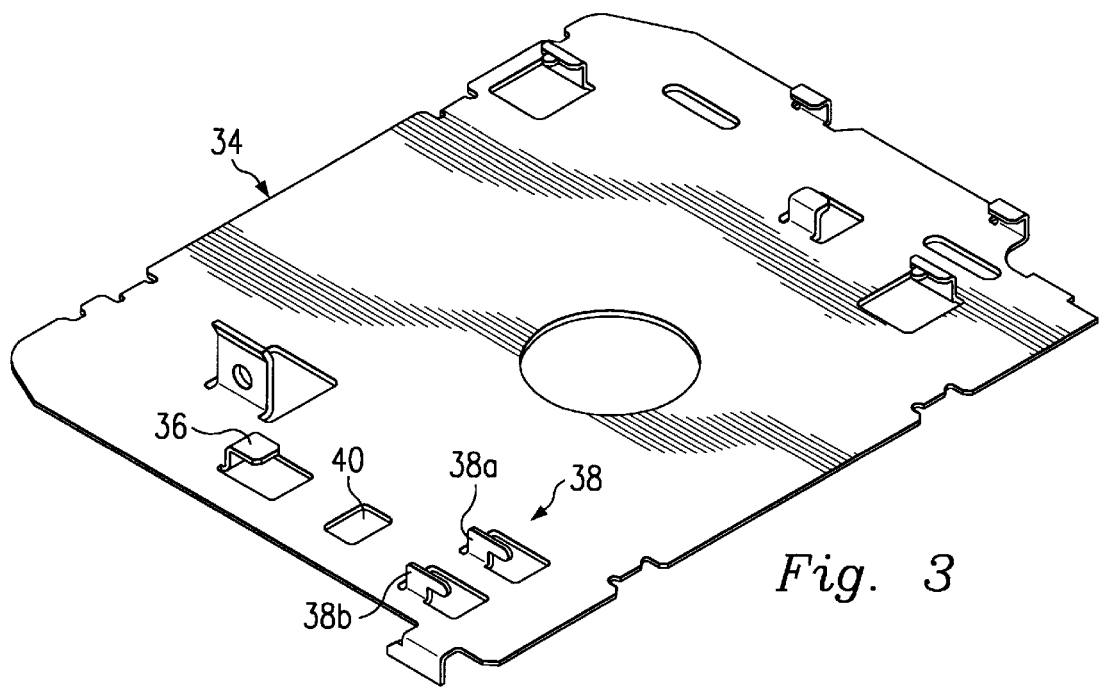
FIG. 3 is an isometric view illustrating an embodiment of a drive plate.

In FIG. 3, a drive plate 34 is illustrated and is used for mounting a disk drive (not shown) thereto for installation into computer system 41. Drive plate 34 is formed of a suitable metal such as cold-rolled steel commonly used in computer hardware. Plate 34 is generally rectangular and includes a first retainer 36, a second retainer 38, and an aperture 40 formed through plate 34 approximately midway between first retainer 36 and second retainer 38. The first retainer 36 is in the form of a single L-shaped tab formed with the plate 34. The second 38 retainer comprises L-shaped hooks 38a, 38b, which are spaced apart and formed with the plate 34.

Figure 4:
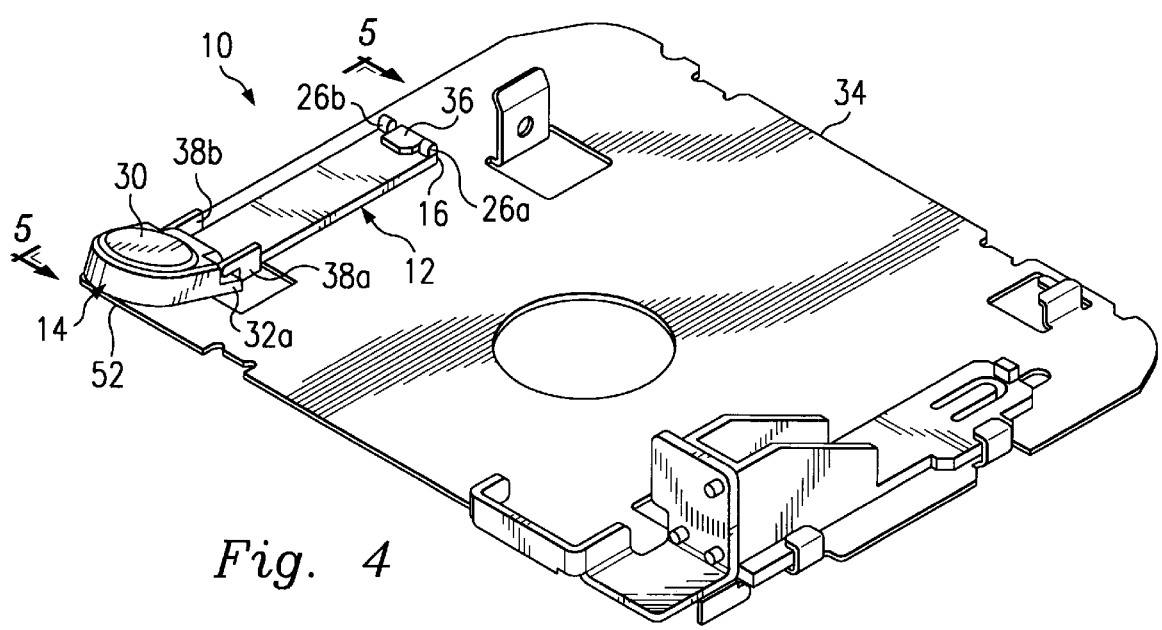
FIG. 4 is an isometric view illustrating an embodiment of the interlock device mounted on the drive plate.
Figure 5:
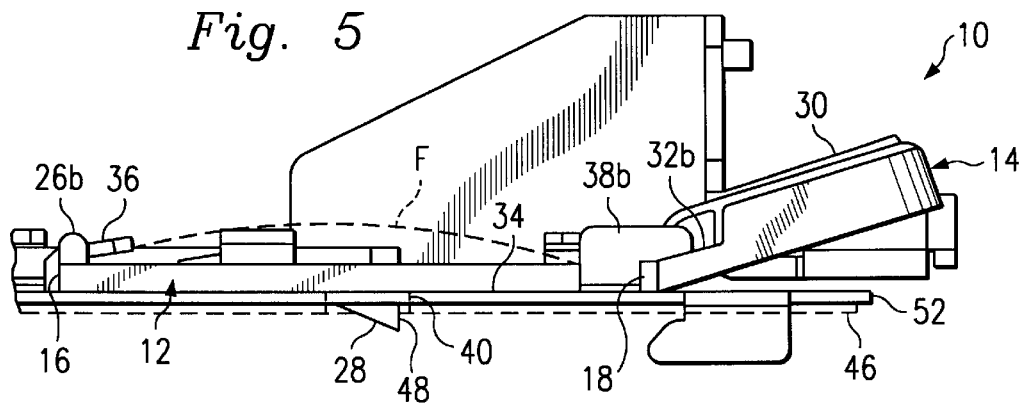
FIG. 5 is a side view illustrating an embodiment of the interlock device mounted on the drive plate as viewed from line 5—5 of FIG. 4.

In FIGS. 4 and 5, interlock device 10 is mounted on plate 34. First end 16 of first portion 12 is engaged by first retainer 36, which extends between spaced apart guides 26a, 26b. Hooks 38a and 38b engage spaced apart groove guides 32a, 32b, respectively, of second portion 14. Also, wedge shaped interlock member 28, FIG. 5, extends through and is engaged with aperture 40 of plate 34.

Figure 6:
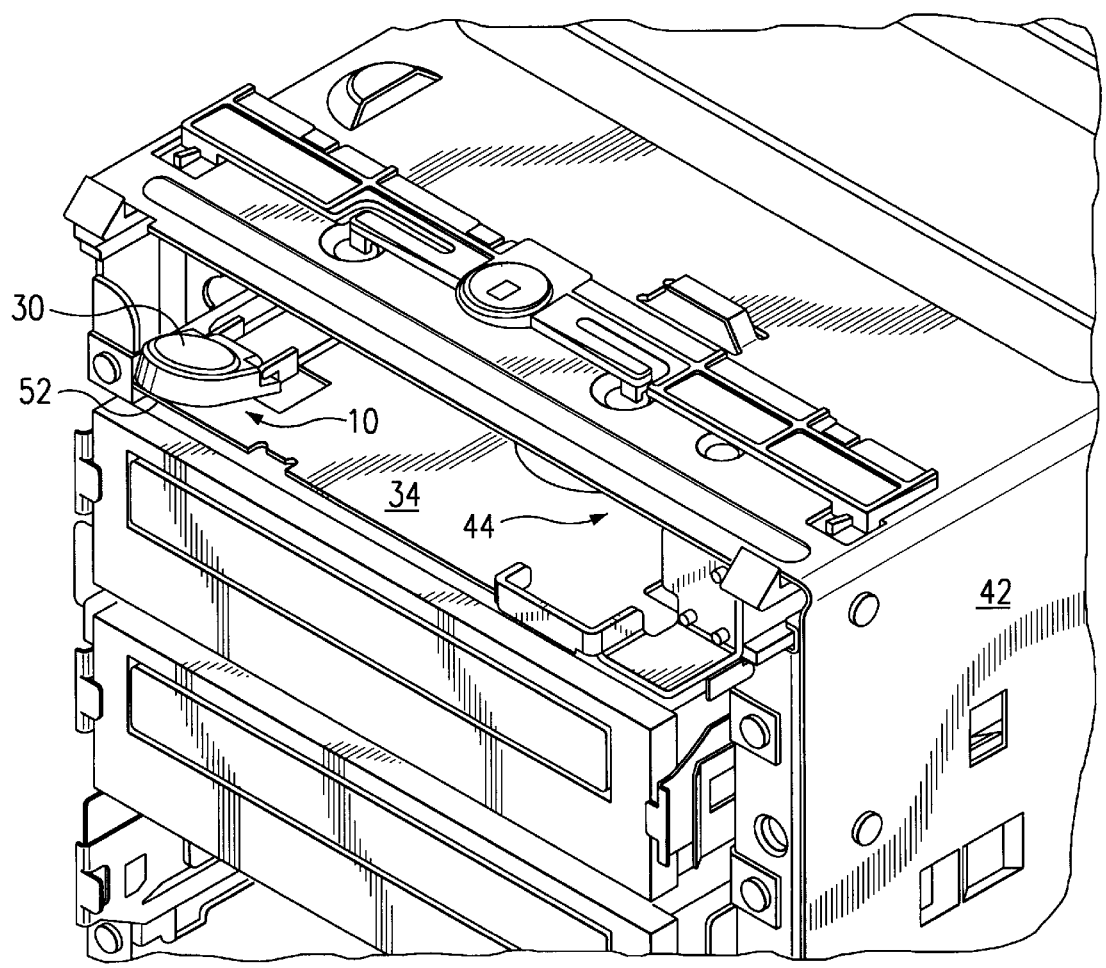
FIG. 6 is an isometric view illustrating an embodiment of the drive plate and interlock device mounted in a computer chassis.

In FIGS. 5 and 6, a computer chassis 42, includes a drive bay 44 having a support plate 46, FIG. 5, mounted therein. Support plate 46 is beneath drive plate 34 and is therefore not visible in FIG. 6. Support plate 46 includes an aperture 48 formed therethrough which is positioned for alignment with aperture 40 of drive plate 34 when drive plate 34 is mounted in chassis 42.

The above-described components, FIGS. 5 and 6, provide a plate 34 for mounting in chassis 42. Interlock device 10 interconnects the plate 34 and the chassis 42 and includes first portion 12 having first end 16 engaged with first plate retainer 36. Second portion 14 of interlock 10 is connected to second end 18 such that the second portion 14 extends angularly relative to the first portion 12. The second portion 14 is engaged with the second plate retainer 38. Interlock member 28 extends from the first portion 12 and through aperture 40 in plate 34 for engagement with chassis 42.

More specifically, plate 34 is mounted on support plate 46 of a drive bay 44 in chassis 42. Support plate 46 includes aperture 48 formed therein. Interlock device 10 releasably engages the drive plate 34 and the support plate 46 due to interlock member 28 extending through apertures 40 and 48. First portion 12 is a flexible, elongated member and includes the raised first guides 26a, 26b spaced apart at first end 16 for receiving the overlapping retainer 36. Second portion 14 includes gripping area 30 and grooved second guides 32a, 32b, spaced apart for receiving the overlapping hooks 38a, 38b, respectively, of retainer 38, immediately adjacent second end 18. First portion 12 abuts drive plate 34 and second portion 14 extends away from plate 34 for being gripped at gripping area 30 and moved toward plate 34 for flexing first portion 12 to a bowed position designated F and illustrated in phantom in FIG. 5, between first end 16 and second end 18 so that interlock member 28 is movable out of aligned apertures 40, 48 in drive plate 34 and support plate 46, respectively.

In operation, FIGS. 1 and 4, interlock device 10 is mounted on plate 34 by inserting end 16 under retainer 36 so that retainer 36 is received between guides 26a, 26b. Also, hooks 38a, 38b are inserted in groove guides 32a, 32b, respectively. End 16 is moved toward retainer 36. Wedge-shaped interlock 28 is urged against plate 34, thus causing mid-portion 20 to bow until interlock 28 is positioned to snap into and extend through aperture 40 when interlock device 10 becomes fully engaged by retainer 36 and hooks 38a, 38b. This is possible because first portion 12 is flexible. At this point, interlock device 10 is fully engaged with plate 34 as viewed in FIG. 4.

When a disk drive, not shown, is mounted on plate 34, FIGS. 5 and 6, and it is desired to mount plate 34 in chassis 42, plate 34 is placed on support plate 46. As plate 34 is inserted into drive bay 44, portions of plate 34 are engaged with guide members (not shown) extending from plate 46. When wedge-shaped interlock 28 engages support plate 46, first portion 12 of interlock device 10 bows upwardly as viewed in FIG. 5. When drive plate 34 is fully inserted in drive bay 44, wedge-shaped interlock 28 snaps into and extends through aperture 48 in support plate 46, which is aligned with aperture 40 of drive plate 34, and plate 34 is seated in drive bay 44.

Removal of drive plate 34 from drive bay 44 is accomplished by grasping gripping area 30 of second portion 14 and simultaneously grasping an edge portion 52 of plate 34 adjacent gripping area 30, FIGS. 4, 5 and 6. Gripping area 30 can be moved toward plate 34 because gripping area 30 is angled away from plate 34. When gripping area 30 of second portion 14 is flexed with respect to first portion 12 and moved toward plate 34, mid-portion 20 of first portion 12 is flexed away from plate 34 lifting wedge-shaped interlock 28 out of aligned apertures 40, 48, thus disengaging plate 34 and plate 46 and allowing plate 34 to be removed from bay 44. The grasping or pinching action applied at gripping area 30 provides a natural grip point when the drive plate 34 is to be removed.

As it can be seen, the principal advantages of the embodiments herein are that the interlock device may be easily attached to and removed from the drive plate. The drive plate is easily inserted into the chassis by a snap-in connection, and is easily removable from the chassis by a one-handed pinch and pull motion.

Although illustrative embodiments have been shown and described, a wide range of modifications, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computer system comprising:

a microprocessor;

an input device coupled to provide input to the microprocessor;

a mass storage device coupled to the microprocessor;

a display coupled to the microprocessor by a video controller;

a memory coupled to provide storage to facilitate execution of computer programs by the microprocessor;

a chassis;

a drive bay in the chassis, the drive bay including a support plate mounted therein;

a drive plate mounted on the support plate; and an interlock member releasably engaging the drive plate and the support plate, including a first portion having a first end engaged with a first retainer on the drive plate and a second portion connected to a second end, the second portion extending angularly relative to the first portion and being engaged with a second retainer on the drive plate, and an interlock member extending from the first portion and through aligned openings formed in the drive plate and the support plate.

2. The computer system as defined in claim 1 wherein the first portion is a flexible elongated member and the second portion includes a gripping area.

3. The computer system as defined in claim 1 wherein the first portion includes a pair of raised first guides spaced apart for receiving the first retainer.

4. The computer system as defined in claim 3 wherein the second portion includes a pair of grooved second guides spaced apart for receiving the second retainer.

5. The computer system as defined in claim 2 wherein the first portion abuts the drive plate and the second portion extends away from the drive plate for being gripped and moved toward the drive plate for flexing the drive plate for first portion between the first and second ends thereof away from the plate, whereby the interlock member is urged out of the aligned openings in the drive plate and the support plate, respectively.

6. The computer system as defined in claim 4 wherein the first retainer overlaps the first end between raised first guides and the second retainer overlaps the grooved second guides.

7. A computer system comprising:

a plate for mounting in a chassis in the system; and an interlock device connecting the plate and the chassis, interlock device including a first portion having a first end engaged with a first plate retainer and a second portion connected to a second end, the second portion extending angularly relative to the first portion and being engaged with a second plate retainer, and an interlock member extending from the first portion and through an opening formed in the plate for engagement with the chassis.

8. The computer system as defined in claim 7 wherein the first portion is a flexible.

9. The computer system as defined in claim 7 wherein the first portion includes first guides for receiving the first plate retainer.

10. The computer system as defined in claim 9 wherein the second portion includes second guides for receiving the second plate retainer.

11. The computer system as defined in claim 8 wherein the first portion abuts the plate and the second portion extends away from the plate and is movable toward the plate for flexing the first portion away from the plate, whereby the interlock member is withdrawn from the opening in the plate.

12. The computer system as defined in claim 10 wherein the first plate retainer includes a tab extending from the plate and overlapping the first end between the first guides.

13. The computer system as defined in claim 12 wherein the second plate retainer includes a pair of spaced apart tabs extending from the plate and overlapping the second guides.

14. A computer system comprising:

a chassis;

a plate mounted on the chassis; and an interlock device releasably engaging the plate and the chassis, the interlock device including a first portion having a first end engaged with a first retainer on the plate and a second portion connected to a second end, the second portion extending angularly relative to the first portion and being engaged with a second retainer on the plate, and an interlock member extending from the first portion and through an opening formed in the plate for engagement with the chassis.

15. The computer system as defined in claim 14 wherein the first portion is an elongated flexible member.

16. The computer system as defined in claim 14 wherein the first portion includes a pair of raised first guides for receiving the first retainer.

17. The computer system as defined in claim 16 wherein the second portion includes a pair of grooved second guides for receiving the second retainer.

18. The computer system as defined in claim 15 wherein the first portion abuts the plate and the second portion extends away from the plate and is movable toward the plate for flexing the first portion away from the plate, whereby the interlock member is urged out of the opening in the plate.

19. The computer system as defined in claim 17 wherein the first retainer includes a tab extending from the plate and overlapping the first end between the first raised guides.

20. The computer system as defined in claim 19 wherein the second retainer includes a pair of spaced apart tabs extending from the plate and overlapping the second grooved guides.

21. In a computer system having a chassis and at least one support plate having a retainer and a pair of groove guides, wherein the support plate is attached to the chassis, a method for removably securing a device plate to the support plate using an interlock device having a gripping portion, the method comprising the steps of:

mounting the interlock device onto the device plate;

placing the device plate onto the support plate;

slidably inserting the device plate into the chassis until the interlock device engages the support plate; and disengaging the interlock device from the support plate for removal of the device plate.

22. The method of claim 21 wherein the step of mounting comprises the steps of:

inserting the interlock device under the retainer;

pivotally rotating the interlock device about the retainer; and urging the interlock device into engagement with the pair of groove guides.

23. The method of claim 21 wherein the step of disengaging comprises the steps of:

grasping the device plate; and simultaneous with the grasping step, urging the gripping portion closer to the device plate to separate the interlock device from the support plate.

* * * * *

UNITED STATES PATENT AND TRADEMARK OFFICE
CERTIFICATE OF CORRECTION

PATENT NO. : 5,852,739
DATED : December 22, 1998
INVENTOR(S) : Timothy Radloff and Stephen Cook It is certified that error appears in the above-identified patent and that said Letters Patent is hereby corrected as shown below:

On the title page, item [73]

Assignee: "Dell Computer Corporation" should be --Dell USA, L.P.--

Signed and Sealed this

Twenty-fourth Day of August, 1999

Attest:

Q. TODD DICKINSON

*Attesting Officer*   Acting Commissioner of Patents and Trademarks